(12) United States Patent
Kroman

(10) Patent No.: US 6,296,356 B2
(45) Date of Patent: Oct. 2, 2001

(54) PAIR OF SPECTACLES AND A METHOD FOR THE MANUFACTURING OF A PAIR OF SPECTACLES

(75) Inventor: Flemming Kroman, Brabrand (DK)

(73) Assignee: Lindberg A/S, Abyhoj (DK)

( * ) Notice: Subject to any disclaimer, the term of this patent is extended or adjusted under 35 U.S.C. 154(b) by 0 days.

(21) Appl. No.: 09/803,622

(22) Filed: Mar. 12, 2001

Related U.S. Application Data

(60) Division of application No. 09/329,681, filed on Jun. 10, 1999, which is a continuation-in-part of application No. PCT/DK97/00563, filed on Dec. 1, 1997, now abandoned.

(30) Foreign Application Priority Data

Dec. 12, 1996 (DK) .................................................. 1421/96

(51) Int. Cl.$^7$ ....................................................... G02C 5/12
(52) U.S. Cl. .............................. 351/138; 351/78; 351/80; 351/88; 351/138
(58) Field of Search .................................. 351/88, 83, 76, 351/65, 78, 80, 136, 137, 138, 139

(56) References Cited

U.S. PATENT DOCUMENTS

| 4,951,322 | * | 8/1990 | Lin ...................................... 351/138 |
| 5,671,040 | * | 9/1997 | Minh .................................... 351/138 |

* cited by examiner

Primary Examiner—Hung Xuan Dang
(74) Attorney, Agent, or Firm—Thomas R. Vigil

(57) ABSTRACT

A pair of spectacles comprises two support elements (7) for engaging the nose of the wearer. Each support element comprises a pad (8) of an elastic material secured to a shank (10) with an enlarged head (11) adapted for retaining the support element relative to the rest of the spectacles by way of inserting the shank through said eyelet of the frame. According to the invention a peg (13) is inserted into the head end of the shank for providing a hard core inside at least part of the shank. Thus, easy mounting and safe retention are provided. The invention further comprises a blank for the manufacturing of the peg, and a method of manufacturing a pair of spectacles.

6 Claims, 4 Drawing Sheets

PAIR OF SPECTACLES AND A METHOD FOR THE MANUFACTURING OF A PAIR OF SPECTACLES

CROSS REFERENCE TO RELATED APPLICATIONS

This is a division of application Ser. No. 09/329,681 filed on Jun. 10, 1999, which is a continuation-in-part of international application PCT/DK97/00563, with an international filing date of Dec. 1, 1997, now abandoned. This application is based on application Ser. No. 1421/96 filed in Denmark on Dec. 12, 1996, the contents of which are incorporated hereinto by reference.

FIELD OF THE INVENTION

The present invention relates to a pair of spectacles provided with a support element adapted for engaging a portion of the wearer's face. The invention further relates to a blank forming part of such support element and to a method for the manufacturing of a pair of spectacles.

As used herein spectacles mean the well known means which substantially comprises two lenses of glass or of other refractive or tinted material intended to be worn in front of the eyes of the user enabling him to see through the glasses, and a form of support or spectacle frame arranged to keep the lenses or glasses expediently fixed in the preferred position of use where the user can look straight forward with both eyes and with parallel lines of sight through the respective lenses.

In order to meet the functions of both supporting the weight of the spectacles and ensuring a relatively stable position in relation to the head of the user, the support element is normally adapted for engaging one or more portions of the wearer's face, typically for engagement on the sides of the bridge of the nose. The support elements may comprise portions of the spectacle frame proper portions of the rims of the glasses, or dedicated separate elements secured to the spectacle frame or to the glasses.

The invention is relevant to spectacles in which the support elements comprise pads of particularly elastic, shock absorbing material selected for the best possible user comfort. With this design the spectacle frame generally does not touch the bridge of the nose, and the dimensions of the spectacle frame proper can be kept to a minimum, and as a result thereof the weight of the spectacles as a whole is kept to a minimum.

THE PRIOR ART

It is known in the art to structure a spectacle frame of a wire of a light weight alloy comprising titanium and with two support elements engaging the respective sides of the bridge of the nose, each support element comprising a pad integral with a shank with an enlarged head and being secured by way of inserting said shank with the enlarged head through a corresponding eyelet in the spectacle frame. In the prior art spectacles, the eyelet comprises a wire formed into a bight with a lateral opening. The lateral opening is narrow, causing the support element to be elastically deformed during insertion and then retained. The eyelet supports the support element so that it is allowed to tilt elastically when subjected to external forces, whereby these spectacles offer a particularly good comfort.

However, with this prior art solution it may happen that an accidental impact striking one of the support elements may displace the element away through the lateral opening of the eyelet with the risk of losing the support element. In the prior art spectacles, the retention may be enhanced by a deformation of the wire squeezing together the lateral eyelet opening. However, there may be an occasional need for replacing the support elements, and a method involving deformation of the wire providing the eyelet in connection with each replacement procedure involves the risk of a deterioration of the structural properties of the wire in time.

SUMMARY OF THE INVENTION

The invention, in a first aspect provides a pair of spectacles provided with a support element adapted for engaging a portion of the wearers face, said spectacles comprising an eyelet, said support element comprising a pad of elastic material secured to a shank with an enlarged head, said shank comprising an elastic material and being adapted for being received in and for being retained by said eyelet, said spectacles further comprising a peg driven into said shank in order to provide a hard core inside at least part of said shank.

In these spectacles the eyelet adapted for retaining the pad may be provided with a lateral opening or it may be substantially closed so that the shank of the support element is to be inserted by threading axially through the eyelet. Once the shank is introduced into the eyelet, the peg is inserted axially into the shank from the opposite side of the eyelet. The peg resists any squeezing together of the shank and the head of the shank and thereby ensures anchoring of the shank in the eyelet.

These spectacles offer a superior retention of the support element without compromising the comfort provided due to the softness and the flexibility of the support element.

According to an expedient embodiment the shank comprises a countersunk bore for receiving the peg. The bore makes it possible to compress the shank as long as the peg is not inserted, and the support element may therefore be introduced into an eyelet with a reduced lateral opening which is narrower than is the case with the prior art. The narrow lateral opening inherently enhances the retention of the support element obtained once the peg has been inserted.

According to an expedient embodiment the peg comprises a tapered front end portion and widened retention means, such as a bulge or a bead adjacent said front end portion for retaining it in the shank. The retention means increases the cross section of the peg, and the retention means should therefore be expediently arranged adjacent to the front end portion of the peg so as to affect the section of the shank located to that side of the eyelet which is situated adjacent the pad. Thus, through its sturdy annular engagement with the shank the eyelet secures the peg.

The tapered front end portion and the retention means are expediently rounded to avoid any acute edges which might otherwise provide crack initiators inside the shank.

According to an expedient embodiment the peg comprises a widened base end portion adapted for providing a widened core portion inside said enlarged head. This provides a reinforced anchoring of the support element in the eyelet.

The invention, in a second aspect, provides a nose pad adapted for supporting a pair of spectacles by engaging a portion of the wearers face, said nose pad comprising a pad of elastic material secured to a shank with an enlarged head, said shank comprising an elastic material and being adapted for being received in and for being retained by an eyelet of said spectacles, said nose pad further comprising a peg driven into said shank in order to provide a hard core inside at least part of said shank.

This nose pad is easy in fitting onto the spectacle frame and it is, once fitted, well secured. The nose pad is suitable for being molded from a soft resilient material adapted for providing a comfortable support of the spectacles.

The invention, in a third aspect, provides blank for use in the manufacturing of a peg adapted for being inserted into the shank of an elastic support element of a pair of spectacles, said blank comprising a dowel with a tapered front end and a widened base end portion and a handling piece, integral with said dowel by said base end portion and provided with a notch at the transition zone bridging said handling piece and said dowel.

This blank may expediently be used for securing a support element in a pair of spectacles as explained above. The manipulation of the peg during its mounting. Following the introduction of the dowel into the support element, the handling piece is snapped off, severing it in the transition zone and leaving the dowel portion which constitutes the peg. The handling piece provides a convenient tool for handling the minute item forming the peg and avoids the risk of accidentally losing it. The blank expediently comprises a transparent plastic material, e.g. polycarbonate or polyamide suitable for injection molding. The sprue or the mold inlet portion appearing in the injection molding process expediently provides the handling piece.

According to an expedient embodiment one handling piece is integral with two dowels. This saves material and the arrangement is expedient in that the pegs are normally requested in pairs.

The invention, in a fourth aspect, provides a method for the manufacturing of a pair of spectacles, comprising the steps of providing said spectacles with an eyelet connected to a spectacle frame, attaching to said frame a resilient support element by inserting a shank of said support element through said eyelet, and driving axially into said shank a peg adapted for providing a hard core inside at least part of said shank.

This method offers an easy assembly of a pair of spectacles which obtains a very expedient form.

Further characteristic features and advantages of the invention will appear from the detailed description given below with reference to the drawings.

DESCRIPTION OF THE PREFERRED EMBODIMENTS

Figure 1:
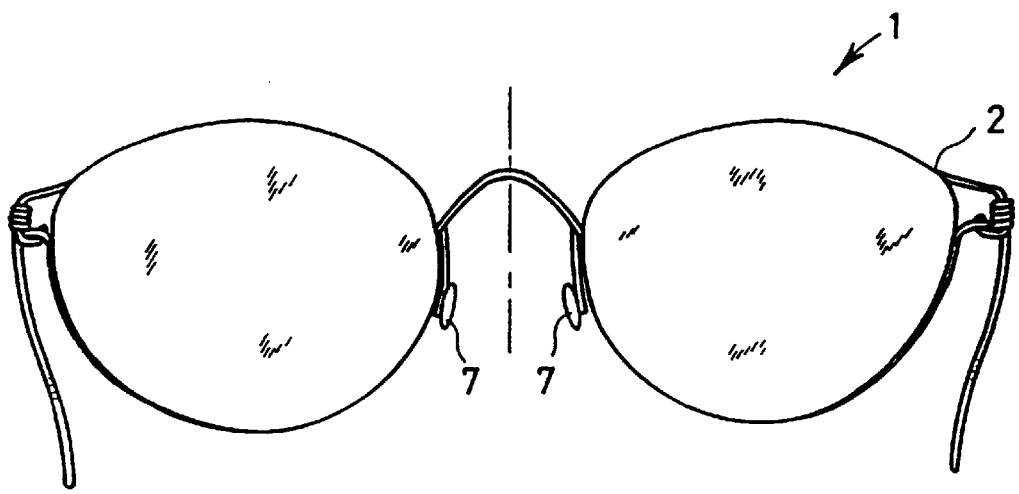
FIG. 1 is a front view of a pair of spectacles according to the invention.

All Figures are schematic and not necessarily drawn to scale and only show details deemed necessary for the understanding of the invention, whereas other details are omitted. All the Figures use the same reference numerals for identical or similar parts.

Figure 2:
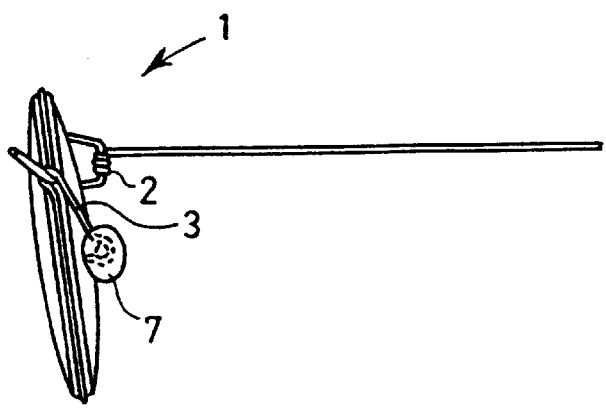
FIG. 2 is a sectional side view of the spectacles, the plane of section being the median plane of the spectacles.

Reference is first made to FIGS. 1 and 2 showing a pair of spectacles 1 according to the invention in front view and in sectional side view, respectively. These spectacles comprise various parts, generally held together by a spectacle frame 2 which provides a means for retaining glasses, hinges for the spectacle temple bars and two support elements 7. The spectacle frame 2 in the preferred embodiment is substantially formed by a resilient metal wire 3, such as a titanium alloy wire which has been found well suited for this purpose. The support elements 7 are expediently provided by appropriate molding of pieces of an elastic silicone rubber.

Figure 3:
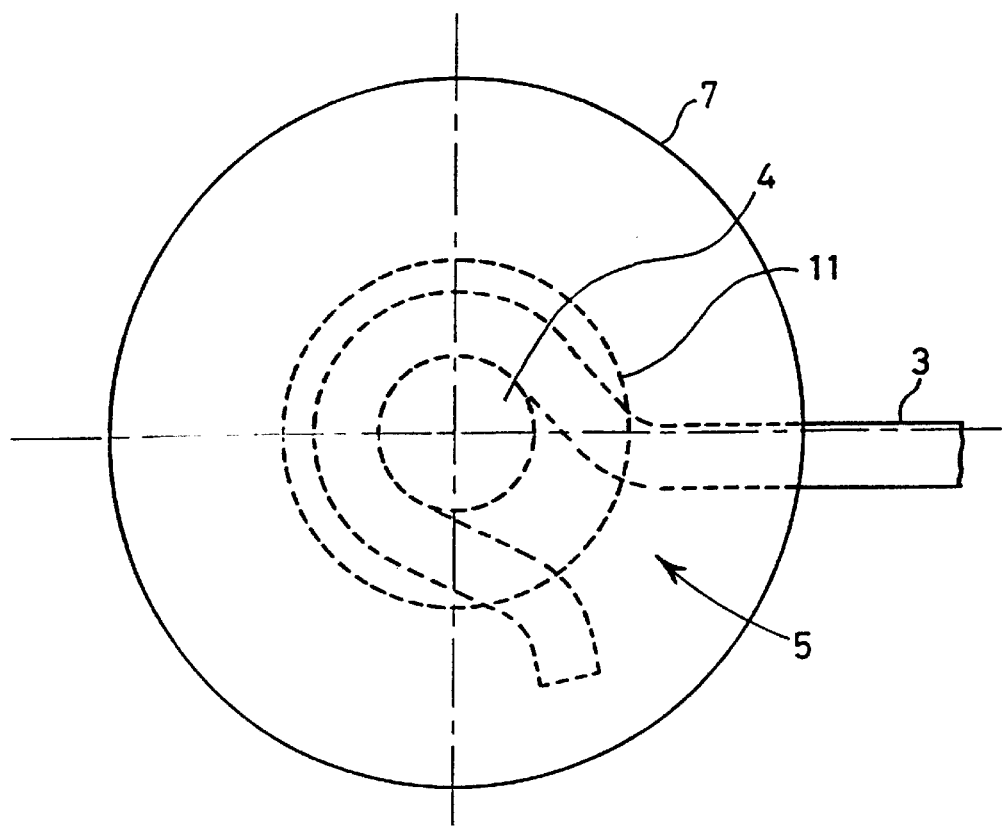
FIG. 3 illustrates the support element and an adjacent portion of the frame, on an enlarged scale.
Figure 4:
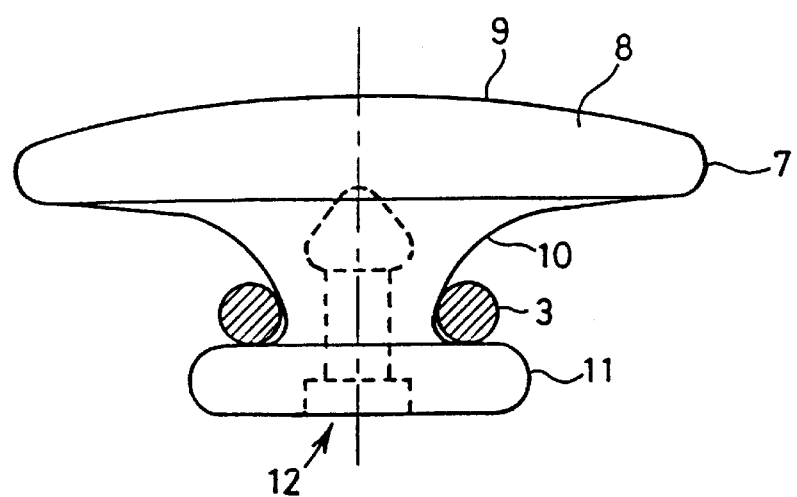
FIG. 4 is a side view of the support element introduced into the eyelet, ready for insertion of the peg.

Reference is now made to FIGS. 3 and 4 which are an enlarged plan view and an enlarged side view, respectively, of a support element intended to engage a portion of the wearer's face. FIGS. 3 and 4 also show a portion of the spectacle frame intended for retaining the support element and provided by appropriate forming of the wire 3 so as to provide an eyelet 4 with a lateral opening 5. The support element 7 proper comprises substantially a flat approximately rotational, symmetric nose pad 8 which presents a surface of contact 9 adapted for engaging a portion of the user's face. On the opposite side, the pad 8 is secured to the shank 10 which terminates in an enlarged head 11. The shank and the head are so arranged that the support element is retained by the eyelet.

The support element 7 comprises a bore 12 through the head 11 and the shank 10. The bore forms a dead hole with an approximately cylindrical portion, widened at the bottom and with a widened recess in the mouth portion, located in the head 11.

Figure 5:
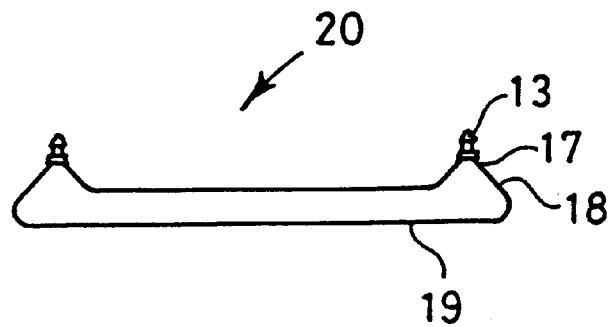
FIG. 5 is a side view of a blank according to the invention.
Figure 6:
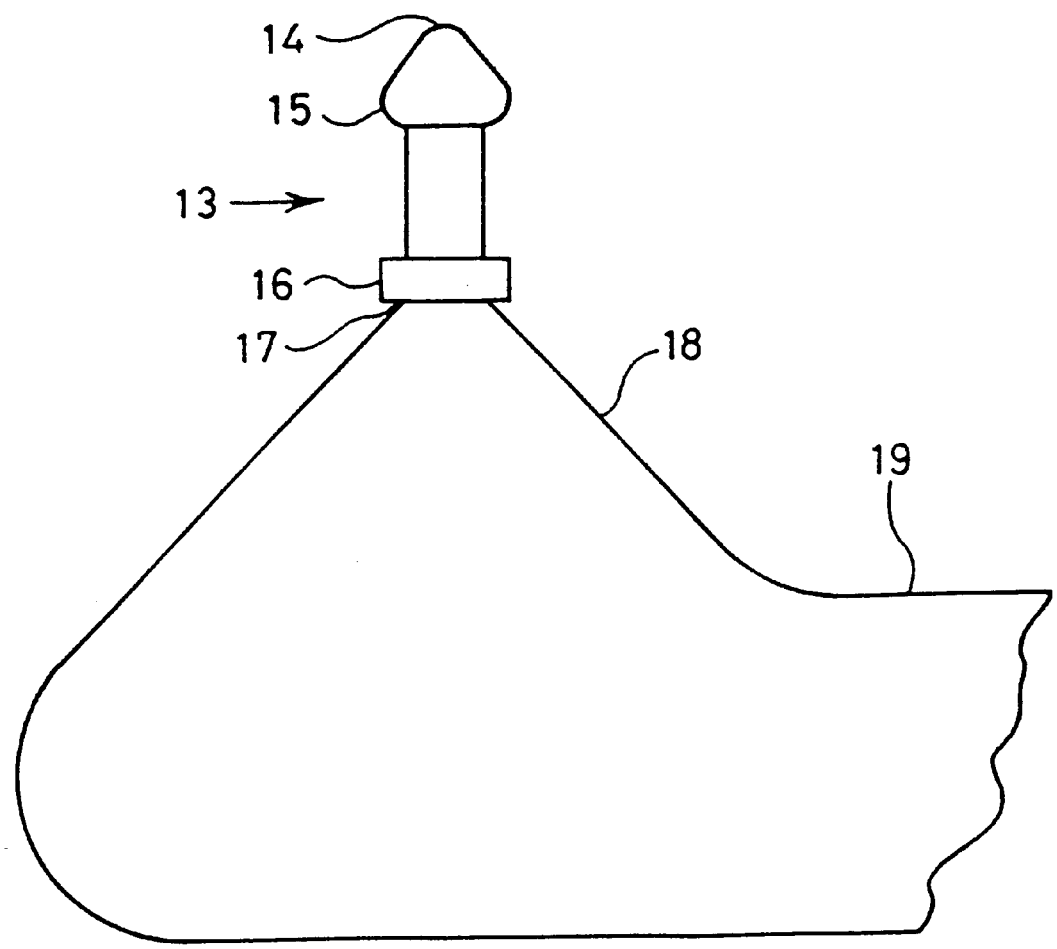
FIG. 6 shows a detail from FIG. 5 depicted on an enlarged scale.

Reference is now made to FIGS. 5 and 6 for a description of the peg 13. The peg 13 is manufactured by injection molding in a plastic material, such as polycarbonate or polyamide. FIG. 5 shows the blank 20 molded in the form of an oblong component with widened end portions, the mold inlet portion 19 from the injection molding process constituting the largest portion and comprising a bar-like body leading through respective branch sprues 18 (pointing upward in FIGS. 5 and 6) and through respective reduced transition zones (see also FIG. 6) into the pegs 13 proper. The peg is a dowel-like element with a tapered generally conical front end 14 which comprises a peripheral, backwards oriented retainer portion 15. Adjacent the reduced section transition zone the peg comprises a widened circular base end portion 16.

Figure 7:
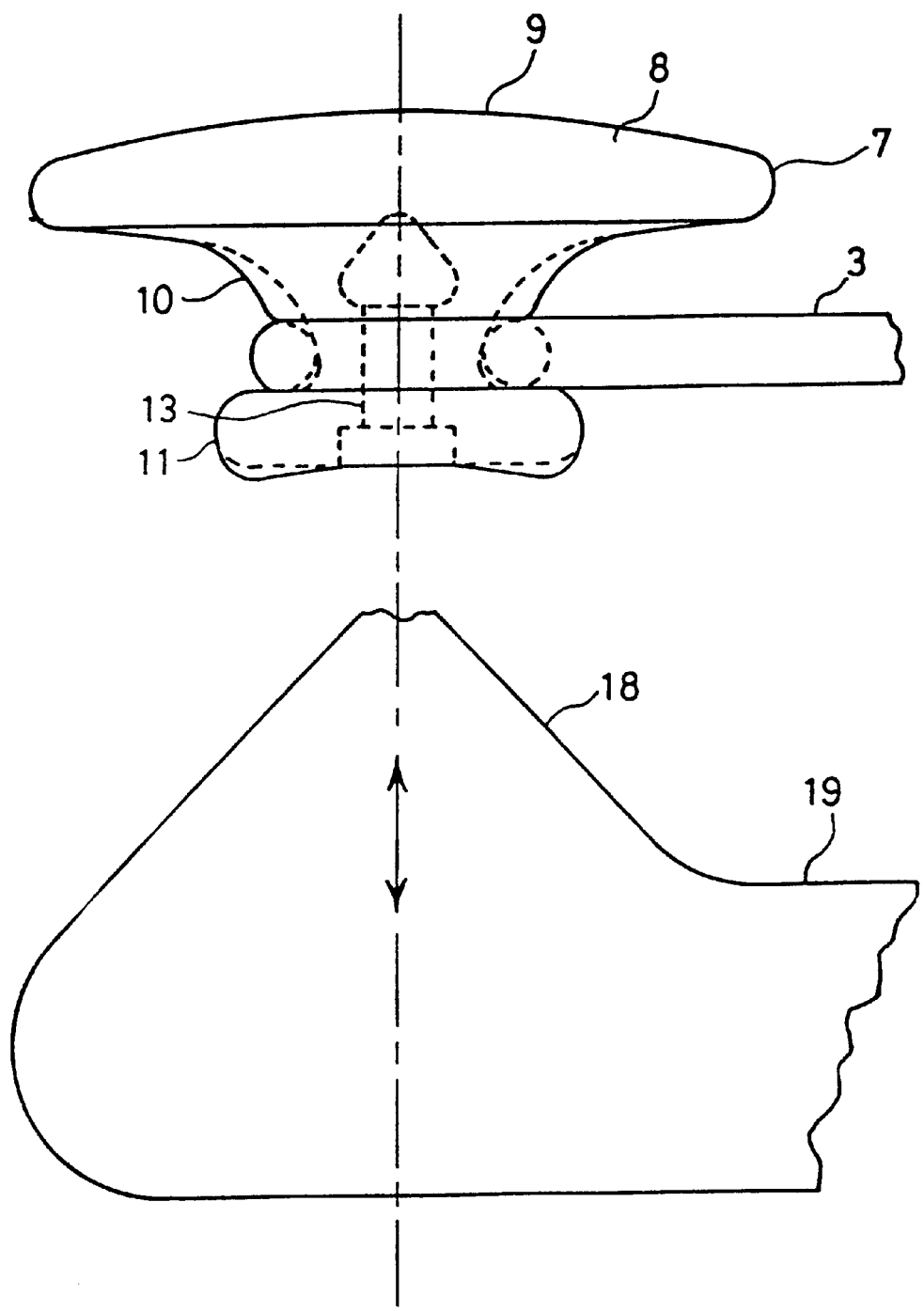
FIG. 7 is a side view of the support element and an adjacent part of the frame during a stage of the mounting of the peg.

Reference is now made to FIG. 7 for a short description of the fitting of the support element in relation to the remaining portion of the spectacles. Following the insertion of the shank of the support element in the eyelet 4 through the lateral opening (to the position shown in FIGS. 3 and 4), the peg is driven into the bore 12, the blank 20 being manipulated by the mold inlet portion 19 during this operation. During the step of insertion the widened retainer portion 15 expands the elastic material of the support element elastically as partially indicated in FIG. 7. The insertion continues until the base end portion 16 engages the widened recess of the bore. The mold inlet portion 19 is snapped off, severing the dowel in the transition zone 17 to leave the peg in the bore, and the mounting is completed.

In the mounted position the peg provides a hard core or backbone inside at least part of the shank 10 of the support element and the support element may thereby be retained by the eyelet without any possibility of being pulled out accidentally.

Should need arise, however, for removing the support element, e.g. for replacement, this can be done by wrenching out the peg 13 of the bore, following which the shank 10 can be pulled out of the lateral opening of the eyelet.

Even though concrete embodiments have been explained above for the elucidation of the invention, these embodiments are in no way considered to limit the invention which may be varied in many ways within the scope of the appended claims.

I claim:

1. A pair of spectacles provided with a support element adapted for engaging a portion of the wearers face, said spectacles comprising an eyelet, said support element comprising a pad of elastic material secured to a shank with an enlarged head, said shank comprising an elastic material and being adapted for being received in and for being retained by said eyelet, said spectacles further comprising a peg driven into said shank in order to provide a hard core inside at least part of said shank.

2. The spectacles according to claim 1, wherein said shank comprises a countersunk bore adapted for receiving said peg.

3. The spectacles according to claim 1, wherein said peg comprises a tapered front end portion and retention means having an annular bead adjacent said front end portion, said retention means being adapted to retain said peg in said shank.

4. The spectacles according to claim 1, wherein said peg comprises a widened base end portion, opposite said front end portion and adapted for providing a widened core portion generally inside said enlarged head.

5. The spectacles according to claim 1, wherein said eyelet is defined by a section of resilient wire, formed into a bight with a reduced lateral opening.

6. Spectacles according to claim 1, wherein said peg comprises a tapered front end portion and retention means having a barbs adjacent said front end portion, said retention means being adapted to retain said peg in said shank.

* * * * *